United States Patent
Wang et al.

(10) Patent No.: US 11,790,943 B2
(45) Date of Patent: Oct. 17, 2023

(54) DUAL-PULSE EXCITATION METHOD FOR ULTRA-FAST, SUPER-RESOLUTION ALL-OPTICAL MAGNETIC RECORDING

(71) Applicant: Jinan University, Guangdong (CN)

(72) Inventors: Sicong Wang, Guangdong (CN); Chen Wei, Guangdong (CN); Xiangping Li, Guangdong (CN)

(73) Assignee: Jinan University, Guangzhou (CN)

( * ) Notice: Subject to any disclaimer, the term of this patent is extended or adjusted under 35 U.S.C. 154(b) by 165 days.

(21) Appl. No.: 17/616,699

(22) PCT Filed: Nov. 16, 2020

(86) PCT No.: PCT/CN2020/128993
§ 371 (c)(1),
(2) Date: Dec. 6, 2021

(87) PCT Pub. No.: WO2022/000937
PCT Pub. Date: Jan. 6, 2022

(65) Prior Publication Data
US 2022/0310121 A1    Sep. 29, 2022

(30) Foreign Application Priority Data
Jul. 3, 2020   (CN) .......................... 202010636656.8

(51) Int. Cl.
*G11B 13/04* (2006.01)
(52) U.S. Cl.
CPC .................. *G11B 13/045* (2013.01)
(58) Field of Classification Search
None
See application file for complete search history.

(56) References Cited

U.S. PATENT DOCUMENTS 4,562,567 A * 12/1985 Frankfort ............. G11B 7/0045
369/111
5,187,694 A * 2/1993 Ichihara ............ G11B 11/10504
360/59

(Continued)

OTHER PUBLICATIONS

E. Abbe, Contributions to the Theory of the Microscope and Microscopic Perception, Schultze, Archiv f. Mikrosk. Anatomie. Bd. 9, 1873, pp. 414-468.

(Continued)

*Primary Examiner* — Peter Vincent Agustin

(57) ABSTRACT

A dual-pulse excitation method for ultra-fast, super-resolution all-optical magnetic recording includes the steps of: providing a first excitation pulse and a second modulation pulse; and focusing the first excitation pulse and the second modulation pulse, and then radiating the two pulses in sequence to a magneto-optical recording medium, so that an area of the magneto-optical recording medium irradiated undergoes opto-magnetic reversal. By controlling the time delay, spatial overlapping area, and energy density ratio between the dual femtosecond laser pulses, it can induce a second reversal of the magnetization field in the spatial overlapping area of the two pulses on the magneto-optical material that can achieve single-pulse opto-magnetic reversal to obtain all-optical magnetic recording beyond the diffraction limit. This process takes place within several hundred picoseconds, thus providing an effective technical means for ultra-high density and ultra-fast magnetic storage.

11 Claims, 3 Drawing Sheets

(56) References Cited

U.S. PATENT DOCUMENTS

| | | | | |
|---|---|---|---|---|
| 5,402,411 | A | * | 3/1995 | Maeda ............... G11B 7/00718 |
| 5,561,652 | A | * | 10/1996 | Fujiwara ................ G11B 7/126 |
| 5,808,972 | A | * | 9/1998 | Matsumoto ............ G11B 7/006 |
| 2004/0258935 | A1 | * | 12/2004 | Kono ................ G11B 11/10506 |
| 2008/0212455 | A1 | * | 9/2008 | Hoeven ................. G11B 7/126 |
| 2021/0203352 | A1 | * | 7/2021 | Xie ....................... H03M 7/008 |
| 2022/0310121 | A1 | * | 9/2022 | Wang ............... G11B 11/10504 |

OTHER PUBLICATIONS

T.A. Ostler et al., Ultrafast Heating as a Sufficient Stimulus for Magnetization Reversal in a Ferrimagnet, Nature Communications, Feb. 7, 2012, pp. 1-6, Macmillan Publishers Limited.

I. Radu et al., Transient Ferromagnetic-Like State Mediating Ultrafast Reversal of Antiferromagnetically Coupled Spins, Research Letter, Nature, Apr. 14, 2011, pp. 205-208, vol. 472, Macmillan Publishers Limited.

C. D. Stanciu et al., All-Optical Magnetic Recording with Circularly Polarized Light, Physical Review Letters, Jul. 27, 2007, pp. 047601-1~047601-4, The American Physical Society.

K. Vahaplar et al., Ultrafast Path for Optical Magnetization Reversal via a Strongly Nonequilibrium State, Physical Review Letters, Sep. 11, 2009, pp. 117201-1~117201-4, The American Physical Society.

Andrei Kirilyuk et al., Ultrafast Optical Manipulation of Magnetic Order, Reviews of Modern Physics, Jul. to Sep. 2010, pp. 2731-2784, vol. 82, No. 3, The American Physical Society.

\* cited by examiner

DUAL-PULSE EXCITATION METHOD FOR ULTRA-FAST, SUPER-RESOLUTION ALL-OPTICAL MAGNETIC RECORDING

FIELD OF THE INVENTION

The present invention relates to the technical field of magneto-optical storage, and specifically relates to a dual-pulse excitation method for ultra-fast, super-resolution all-optical magnetic recording.

BACKGROUND OF THE INVENTION

In the field of big data storage, use of external magnetic fields to achieve magnetization reversal of magnetic materials, that is, traditional magnetic storage technology, is the most mainstream data storage technology today. However, in this technology, the electron spin completes the reversal process in the form of precession, and its characteristic time is a few nanoseconds, which greatly limits the rate of magnetic reversal (A. Kirilyuk, et al., Rev. Mod. Phys. 82, 2731 (2010)). The discovery of all-optical magnetization reversal has injected fresh vitality into the research and application development of ultra-high-rate magnetic storage. Studies have shown that in the absence of any external magnetic field, using only femtosecond laser pulses as the excitation source, the ferrimagnetic material GdFeCo can achieve helicity-dependent and non-helicity-dependent single-pulse all-optical magnetization reversal (CD Stanciu, et al., Phys. Rev. Lett. 99, 047601 (2007); T A Ostler, et al., Nat. Commun. 3, 666 (2012)). Because the magnetic reversal process is realized by the strong exchange coupling interaction between the sublattices of Gd and Fe (I. Radu, et al., Nature 472, 205 (2011)), the reversal time can be shortened to less than 100 ps (K. Vahaplar, et al., Phys. Rev. Lett. 103, 117201 (2009)). This provides an effective way for ultrafast magnetic recording.

However, in addition to the recording rate, the recording density of data storage is also an important indicator for evaluating and weighing the pros and cons of the corresponding storage technology. Although all-optical magnetization reversal has a huge advantage in ultra-fast storage rate, the recording optical field is always limited by the optical diffraction limit (E. Abbe, Arch. Mikroskop. Anat. 9, 413 (1873)), so it cannot minimize the lateral size of the data recording unit and cannot greatly increase the storage density of data storage. This is also a common technical bottleneck faced by almost all storage technologies that rely on optical field excitation.

In the prior art, for example, in Chinese Patent CN201811154711.9, it discloses an ultra-fast/high-density data storage method realized using first-order azimuthally polarized vortex beams. It has ultra-fast and high-density storage characteristics, but its storage density is limited by the diffraction limit of the laser pulse. The diffraction limit mentioned in the context is a scientific phenomenon well known in the field. Due to the existence of the diffraction limit, the focal spot obtained by focusing has a limited minimum, and the focal spot obtained by focusing cannot become infinitely small through focusing.

SUMMARY OF THE INVENTION

An object of the present invention is to break through the bottleneck of the prior art and provide a dual-pulse excitation method for ultra-fast, super-resolution all-optical magnetic recording. The size of all-optical magnetic recording can exceed the limit of the diffraction limit of the focal spot, and the process of magnetic recording occurs in a time scale of several hundred picoseconds (sub-nanoseconds).

In order to achieve the object of the present invention, the following technical solution is provided: a dual-pulse excitation method for ultra-fast, super-resolution all-optical magnetic recording, includes the steps of:

providing a first excitation pulse and a second modulation pulse, the first excitation pulse and the second modulation pulse being both femtosecond laser pulses, and the energy density of the second modulation pulse being less than that of the first excitation pulse; and focusing the first excitation pulse and the second modulation pulse, and then radiating the two pulses in sequence to a magneto-optical recording medium, so that an area of the magneto-optical recording medium irradiated by a laser pulse spot undergoes all-optical magnetization reversal;

the magneto-optical recording medium being a magneto-optical material capable of realizing opto-magnetic reversal by a single laser pulse, the minimum energy density threshold required for realizing all-optical magnetization reversal by a single laser pulse being F, and the energy density of the second modulation pulse<Threshold F≤the energy density of the first excitation pulse;

the critical time interval between two magnetic reversals of the magneto-optical material being $\Delta t_c$, and $\Delta t_c \leq$ the successive incidence time interval between the first excitation pulse and the second modulation pulse<1 nanosecond;

the focal spot of the first excitation pulse and the focal spot of the second modulation pulse having an overlapping portion and a non-overlapping portion, and when the second modulation pulse being radiated to the overlapped portion afterwards, the undissipated part of the energy generated by the radiated first excitation pulse at the beginning being remained in the overlapping portion; the overlapping portion of the focal spot of the first excitation pulse returning to an initial magnetic state after two magnetization reversals, and the non-overlapping portion of the focal spot of the first excitation pulse retaining one magnetization reversal to form a magnetic recording bit.

Preferably, the magneto-optical material is a ferrimagnetic material.

Preferably, the ferrimagnetic material is GdFeCo or TbFeCo.

Preferably, the magneto-optical material is a ferromagnetic material.

Preferably, the second modulation pulse is a single-pulse, or is formed by beam shaping of multiple pulses at the same time. The shape of the focal spot of the pulse formed by beam shaping can be adjusted arbitrarily.

Preferably, the focused focal spot of the first excitation pulse is a circular or elliptical focal spot, and the focused focal spot of the second modulation pulse is a circular, elliptical, or annular focal spot.

Preferably, if the focal spot of the second modulation pulse has a portion that does not overlap with the focal spot of the first excitation pulse, since its energy density is lower than the threshold F, optical magnetization reversal cannot occur.

Preferably, the energy density of the first excitation pulse has a maximum value, above which the magneto-optical material will generate a multi-domain magnetization state.

Preferably, when the second modulation pulse is radiated to the overlapping portion of the first excitation pulse focal spot, the added density of the energy density of the second modulation pulse and the undissipated energy of the overlapping portion is greater than the threshold F.

Preferably, the ratio of the area between the overlapping portion and the non-overlapping portion of the first excitation pulse and the second modulation pulse is adjustable; and the energy densities of the first excitation pulse and the second modulation pulse are adjustable.

Preferably, the time interval between the first excitation pulse and the second modulation pulse is precisely controlled by an optical delay line.

The magneto-optical material capable of realizing single-pulse opto-magnetic reversal is obtained by magnetron sputtering growth method, and the specific composition and film structure of each element can be flexibly controlled.

It also includes a detection pulse, which can be used to record and observe the dynamic process of the ultrafast magnetization reversal. The time delay between the detection pulse and pump pulses (the first excitation pulse and the second modulation pulse) is precisely controlled by an optical delay line.

The principle of the present invention is as follows: the present invention is based on the mechanism of opto-magnetic interaction, and when the first femtosecond laser pulse (i.e., the first excitation pulse) is irradiated to the magneto-optical material capable of achieving single-pulse opto-magnetic reversal (using GdFeCo as Example), the material quickly rises above the Curie temperature. Then, the Gd sublattice and Fe sublattice will experience a strong spin exchange coupling interaction, causing rapid reversal of the sublattices. Within 100 ps, the electron spin of the reversed sublattices can reach a metastable state, that is, within this time scale, the generation of all-optical magnetization reversal can be achieved.

However, in this time scale, due to the influence of the rising lattice temperature, the electron spin of the sublattices cannot achieve the stable state, and therefore cannot continue to realize all-optical magnetization reversal response to next pump pulse. Research shows (taking $Gd_{27}Fe_{63.87}Co_{9.13}$ as an example), when the second pump pulse (i.e., the second modulation pulse) re-excites the sample after 300 ps, under the condition of the appropriate dual-pulse energy density ratio, GdFeCo will undergo a second all-optical magnetization reversal to restore the magnetization field to the initial state, and the second reversal process of the magnetization field can also be achieved within 100 ps after the excitation of the second modulation pulse, that is, the double all-optical magnetization reversal of GdFeCo occurs on a time scale of several hundred picoseconds (sub-nanoseconds). By controlling the overlapping area between the two pump pulses, the magnetization field in the overlapping area is reversed twice, and then the ultra-fast, super-resolution all-optical magnetic recording can finally be realized.

Compared with the prior art, the present invention has the following advantages and effects: (1) Super-resolution all-optical magnetic recording can be realized; due to the diffraction limit, the focused focal spot of the first excitation pulse in the present invention has a limited minimum size; through the dual-pulse effect of the present invention, the magnetic recording area affected by the first excitation pulse can be further reduced, thereby breaking the diffraction limit, i.e. the so-called super-resolution; and at the same time, a further advantage is that the distance between adjacent magnetic recording bits can be further reduced to increase the magnetic recording density. (2) The time scale of super-resolution all-optical magnetic recording is several hundred picoseconds (sub-nanoseconds), that is, ultrafast magnetic recording. (3) It provides strong technical support for ultra-high density and ultra-fast magnetic storage.

The energy of the second modulation pulse in the present invention is lower than the energy of the first excitation pulse, and compared with the current single-beam diffraction-limited all-optical magnetic recording method, this method can flexibly control the opto-magnetic effect excited by the dual-pumped pulses, and it greatly reduces the lateral size of the magnetic recording bit within a time scale of hundreds of picoseconds (sub-nanoseconds), thereby effectively reducing the distance between adjacent magnetic recording bits, and realizing super-resolution all-optical magnetic recording.

DETAILED DESCRIPTION OF THE INVENTION

The specific embodiments of the present invention will be further described below in conjunction with the accompanying drawings.

As shown in FIGS. 1 to 7, a dual-pulse excitation method for ultra-fast, super-resolution all-optical magnetic recording of the present embodiment includes the steps of:

providing a first excitation pulse and a second modulation pulse, the first excitation pulse and the second modulation pulse being both femtosecond laser pulses, and the energy density of the second modulation pulse being less than that of the first excitation pulse; and focusing the first excitation pulse and the second modulation pulse, and then radiating the two pulses in sequence to a magneto-optical recording medium, so that an area of the magneto-optical recording medium irradiated by a laser pulse spot undergoes all-optical magnetization reversal. The magneto-optical recording medium is a magneto-optical material capable of realizing opto-magnetic reversal by a single laser pulse. The minimum energy density threshold required for realizing all-optical magnetization reversal of the single laser pulse is F, and the energy density of the second modulation pulse<Threshold F≤the energy density of the first excitation pulse.

The critical time interval between two magnetic reversals of the magneto-optical material is $\Delta t_c$, and $\Delta t_c \le$ the successive incidence time interval between the first excitation pulse and the second modulation pulse<1 nanosecond; the focal spot of the first excitation pulse and the focal spot of the second modulation pulse have an overlapping portion and a non-overlapping portion, and when the second modulation pulse is radiated to the overlapped portion afterwards, the undissipated part of the energy generated by the radiated first excitation pulse at the beginning is remained in the overlapped portion; the overlapping portion of the focal spot of the first excitation pulse returns to the initial magnetic state after two magnetization reversals, and the non-overlapping portion of the focal spot of the first excitation pulse retains one magnetization reversal to form a magnetic recording bit.

The specific magneto-optical material selected in this embodiment is $Gd_{27}Fe_{63.87}Co_{9.13}$, and its film structure is Glass/AlTi (10 nm)/SiN (5 nm)/GdFeCo (20 nm)/SiN (60 nm). The magneto-optical material can be obtained by magnetron sputtering growth method, and the specific composition and film structure of each element can be flexibly controlled. This embodiment is performed under room temperature conditions in the air.

Figure 1:
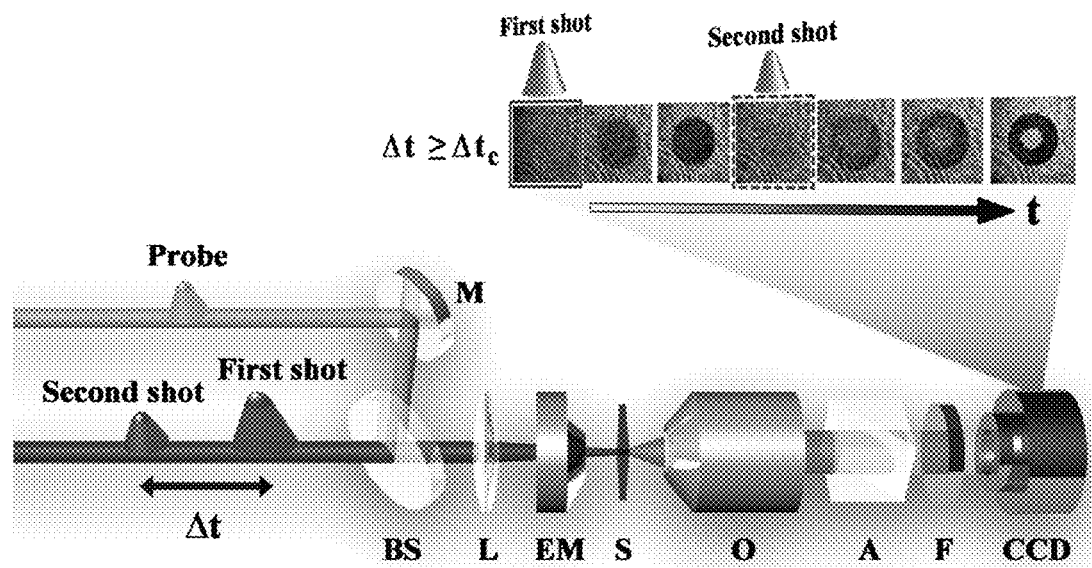
FIG. 1 is a schematic diagram of a time-resolved magneto-optical imaging system based on the dual-pumped femtosecond laser pulses.

As shown in FIG. 1, in order to facilitate the observation of magnetic recording, a time-resolved magneto-optical imaging system based on dual-pumped femtosecond laser pulses is designed. Here, $\Delta t$ is the time interval delay between the two pump pulses (the first excitation pulse and the second modulation pulse), $\Delta t_c$ is the critical time interval delay between two magnetization reversals of the magneto-optical material, which is determined by the physical properties of the material itself. When the time interval between two pulses $\Delta t < \Delta t_c$, no matter how high the energy of the second beam is, the second magnetization reversal cannot be achieved. Here, M is a mirror, BS is a beam combiner, and L is a focusing lens, EM is an electromagnet, S is a magneto-optical material sample, O is an objective lens, A is an analyzer, F is a color filter, and CCD is a charge-coupled device.

The pulse widths of the pump pulses (the first excitation pulse and the second modulation pulse) and the detection pulse are 40 fs, and the wavelengths are 800 nm and 650 nm, respectively. In other embodiments, the wavelength selection of the first excitation pulse and the second modulation pulse is not limited, and the physical mechanism of the all-optical magnetization reversal of the GdFeCo material is the magneto-optical thermal effect, so it has nothing to do with the wavelength of the pump laser.

The energy density of the second modulation pulse is smaller than that of the first excitation pulse. In the figures, the focal spots of the first excitation pulse and the second modulation pulse are both circular. The time delay ($\Delta t$) between the first excitation pulse and the second modulation pulse and the time delay between the detection pulse and the pump pulses are precisely controlled by two optical delay lines, respectively. The pump pulses and the detection pulse pass through the same focusing lens to focus on the $Gd_{27}Fe_{63.87}Co_{9.13}$ sample, and the lateral sizes of the focal spots of the pump pulses are about 160 μm. The imaging objective lens, analyzer, color filter (filtering out 800 nm pump pulses) and charge-coupled device together form the Faraday magneto-optical imaging system unit. According to the Faraday effect, the magnetization fields with different orientations will produce different optical rotation effects on the same polarized probe light. Under the action of the analyzer, the magnetized field regions with different orientations will present images with different contrast degrees on the charge-coupled device, that is, the black and white or light and dark distributions in the figure. During the measurement, an electromagnet is used to initialize the magnetization field of the sample. The figure shows that when $\Delta t \ge \Delta t_c$ (critical time delay), the sample can produce a second all-optical reversal of the magnetization field (i.e., the white area in the center) under the excitation of the second pump pulse.

Figure 2:
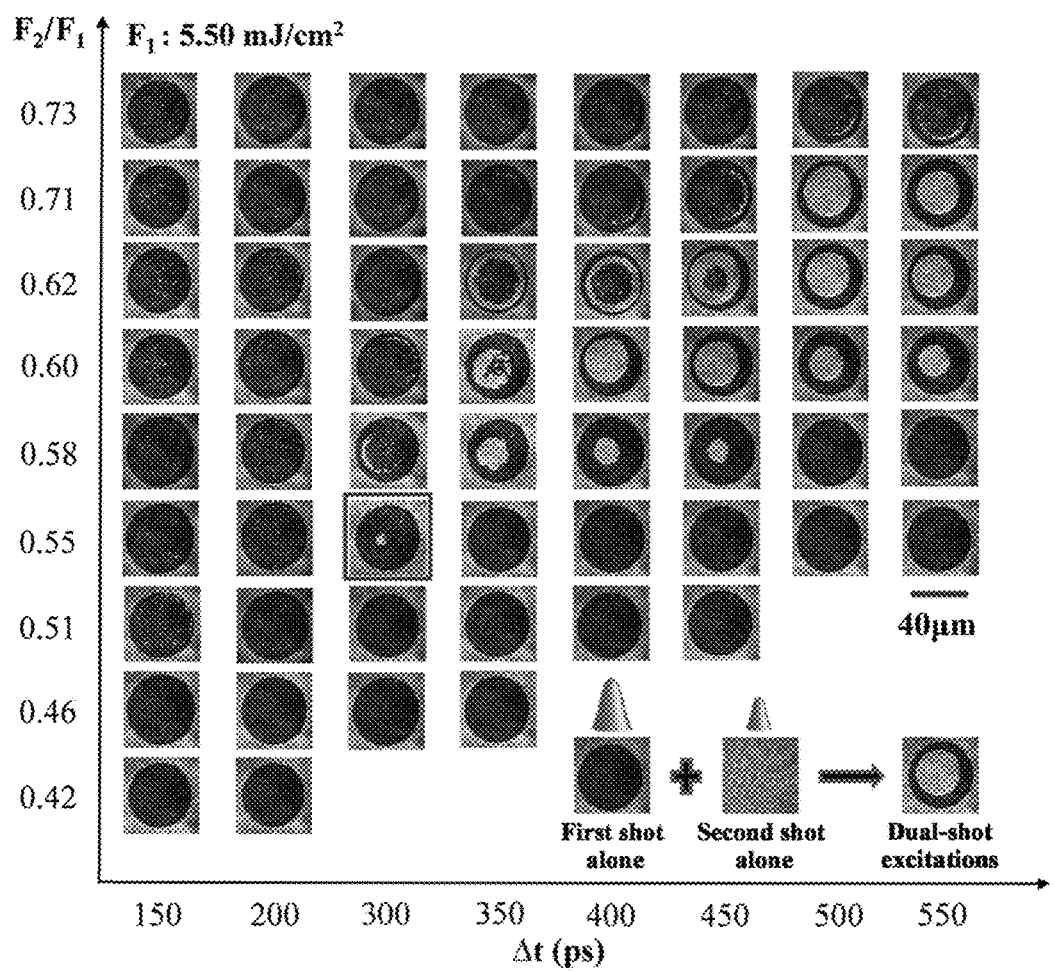
FIG. 2 is a schematic diagram of the relationship among the final magnetization states, Δt and the energy density ratio of the two pump pulses ($F_2/F_1$) when the $Gd_{27}Fe_{63.87}Co_{9.13}$ sample is excited by a dual-pumped femtosecond laser pulse.

FIG. 2 shows the distribution of the end state of the magnetization field under the excitation of the first excitation pulse and the second modulation pulse (dual-pumped femtosecond laser pulse) of $Gd_{27}Fe_{63.87}Co_{9.13}$ under different parameter conditions. Among them, $F_1$ represents the energy density of the first excitation pulse on the surface of the sample, and $F_2$ represents the energy density of the second modulation pulse on the surface of the sample. In this embodiment, the $Gd_{27}Fe_{63.87}Co_{9.13}$ sample is measured, and the threshold F thereof is approximately 5.3 $mJ/cm^2$.

Set $F_1$ to a fixed value of 5.50 $mJ/cm^2$, as shown in the figure, since the energy of the first excitation pulse has reached the reversal threshold of the material, it can independently realize the all-optical magnetization reversal of the material (the black circular area), and the second modulation pulse (for example, $F_2/F_1 = 0.62$) cannot independently realize the all-optical magnetization reversal of the material due to its low energy.

However, under the dual-pump excitation condition, the second pump pulse with the same low energy can achieve the second reversal of the material (the white circular area in the center). This is because under the excitation of the first pump pulse, the lattice temperature of the material will increase, thereby reducing the pump energy required for the second pump pulse to achieve the second reversal. It can be seen from FIG. 2 that only when $\Delta t \ge \Delta t_c$ (300 ps, as shown in the red box), and $F_2/F_1$ is in the appropriate value range, the second pump pulse can induce a second magnetization reversal of the material.

Figure 3:
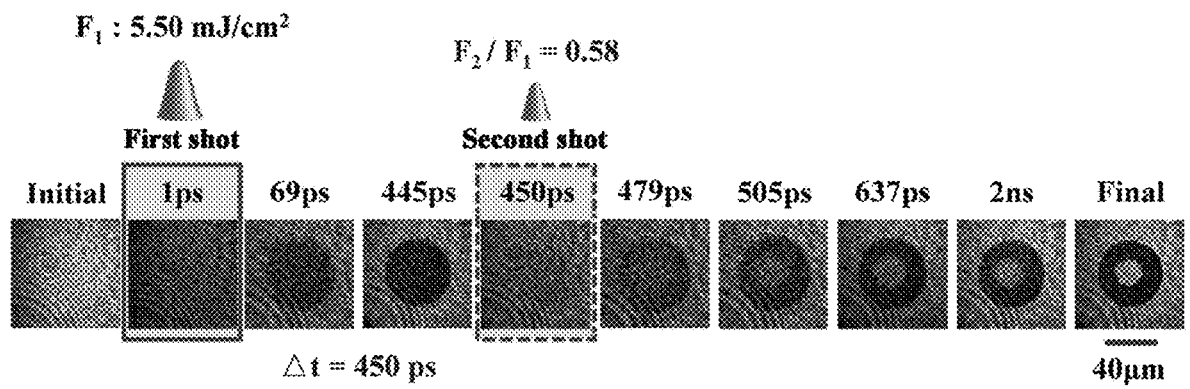
FIG. 3 is a schematic diagram of the dynamic process of the magnetization field of $Gd_{27}Fe_{63.87}Co_{9.13}$ when Δt=450 ps, $F_1$=5.50 mJ/cm$^2$, and $F_2/F_1$=0.58.

FIG. 3 shows the dual-reversal dynamics of the magnetization field of $Gd_{27}Fe_{63.87}Co_{9.13}$ under the excitation of dual-pumped femtosecond laser pulses. Here, $\Delta t = 450$ ps, $F_2/F_1 = 0.58$. It can be seen from the figure that whenever the pump pulse acts on the material, the magnetization field of the material will quickly enter a strongly non-equilibrium state (from a white or black area to a gray area). Subsequently, the material achieves magnetization reversal (black area) or second reversal (central white area) in a short period of time.

Figure 4:
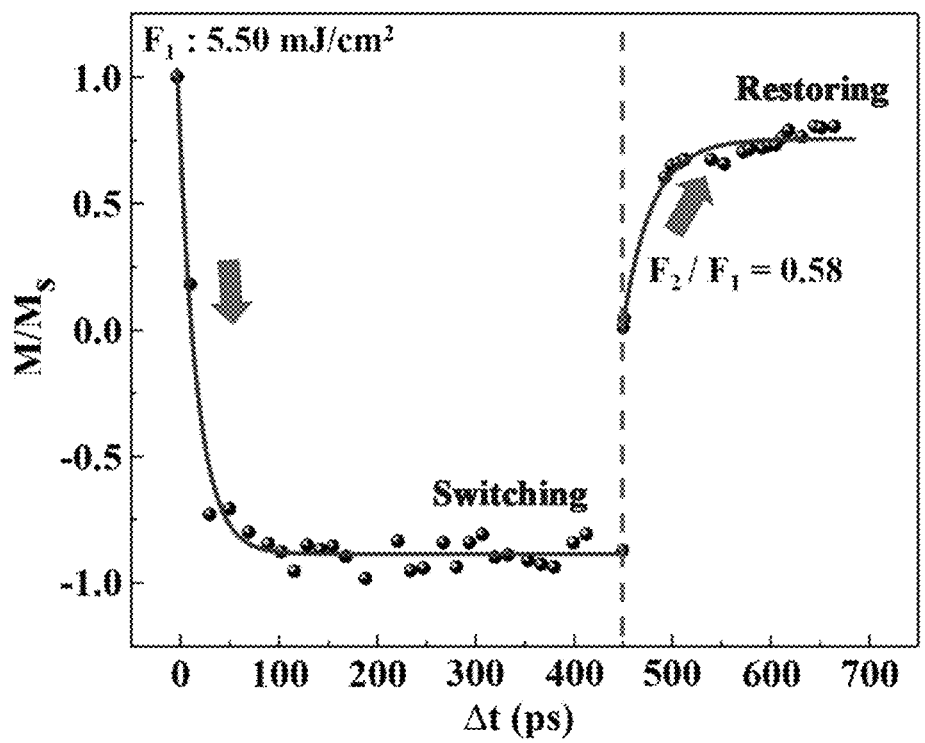
FIG. 4 is a graph of the normalized magnetization field of the central area of the sample corresponding to FIG. 3 as a function of time.

FIG. 4 shows the change of the normalized magnetization field of the central region of the sample corresponding to FIG. 3 over time. As can be seen from the figure, whenever the pump pulse acts on the material, the magnetization field of the material can reach the metastable state of reversal or second reversal within 100 ps, that is, the occurrence of magnetization field reversal and second reversal is observed. It can be seen that when the time delay between the dual-pumped pulses is 450 ps, the double magnetization reversal of $Gd_{27}Fe_{63.87}Co_{9.13}$ can be observed within 550 ps, that is, ultra-fast reciprocating all-optical magnetization reversal.

Based on the ultra-fast reciprocating all-optical magnetization reversal effect of $Gd_{27}Fe_{63.87}Co_{9.13}$ under specific pumping conditions, we have experimentally realized super-resolution all-optical magnetic recording.

Figure 5:
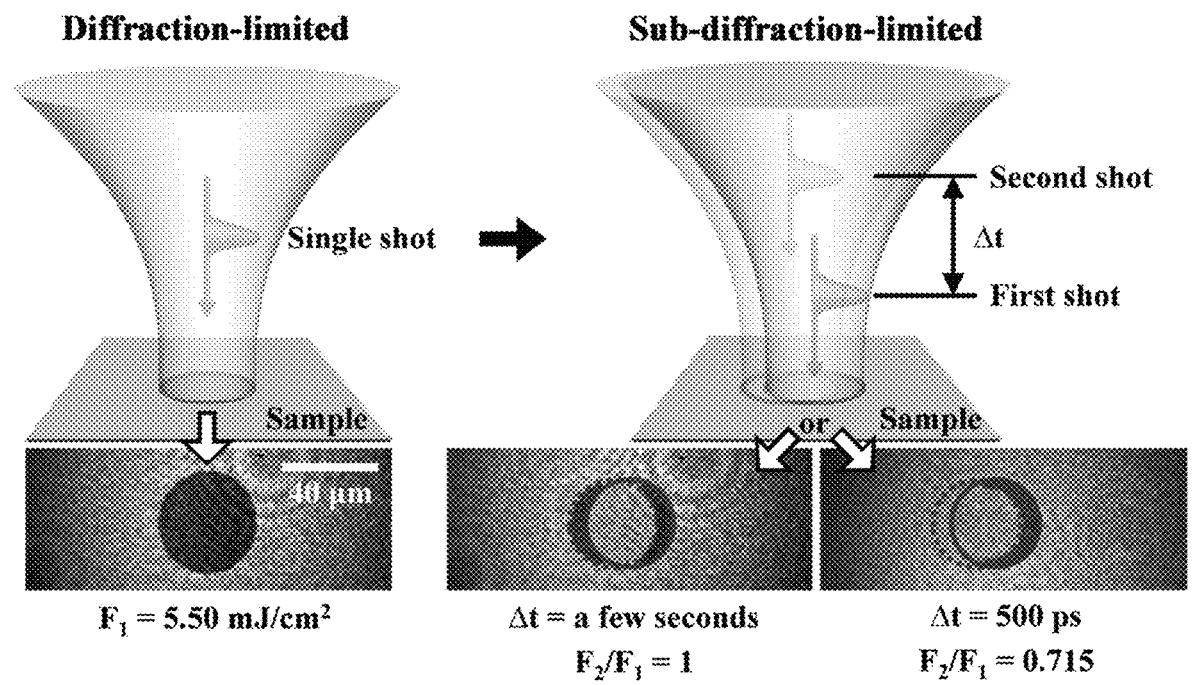
FIG. 5 is a schematic diagram of super-resolution all-optical magnetic recording and recording results based on dual-pumped femtosecond laser pulse excitation.

As shown in FIG. 5, under the traditional single-beam diffraction-limited all-optical magnetic recording condition, we can obtain a magnetic recording bit with a lateral size of about 40 µm. In contrast, under the excitation of the dual-pumped pulse, the magnetization field in the spatial overlapping region of the two pulses can be restored to the initial state by the second reversal effect, that is, reversed back to the white region. Wherein, the marked solid circular area and dotted circular area respectively represent the irradiation areas of the first excitation pulse and the second modulation pulse on the sample. However, if we do not optimize $\Delta t$ and $F_2/F_1$, such as the time interval between the two pulses is longer and the energy densities are the same ($F_2/F_{1=1}$), the material will eventually leave a symmetrical double crescent-shaped magnetic recording bit distribution. This bit distribution will severely limit the application of this method in all-optical magnetic recording.

Conversely, when we optimize $\Delta t$ and $F_2/F_1$, such as $\Delta t=500$ ps and $F_2/F_1=0.715$, only a single crescent-shaped magnetic recording bit distribution will be left on the material. Its lateral size is about 8 µm, which is 80% less than the lateral size of the diffraction-limited magnetic recording bit. In conjunction with FIG. 4, we can know that this recording process takes place in a time scale of 550 ps, that is, ultra-fast, super-resolution all-optical magnetic recording is realized. GdFeCo materials with different compositions have slight differences in the time scale of the double reversal of the magnetization field, but they are basically on the time scale of several hundred picoseconds (sub-nanoseconds).

Figure 6:
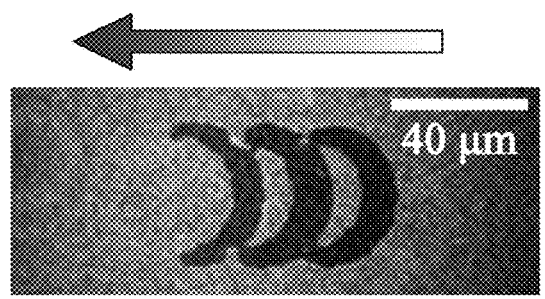
FIG. 6 is a distribution diagram of the super-resolution magnetic recording bit array generated when the pump pulses sweep across the sample from right to left under the experimental conditions shown in FIG. 5.
Figure 7:
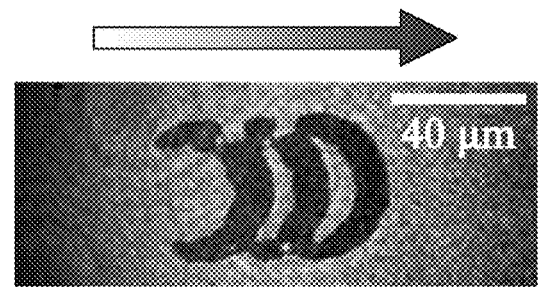
FIG. 7 is a distribution diagram of the super-resolution magnetic recording bit array generated when the pump pulses sweep across the sample from left to right under the experimental conditions shown in FIG. 5.

FIGS. 6 and 7 show the distributions of super-resolution magnetic recording bit arrays generated when the dual-pumped pulses sweep across the sample from right to left and from left to right, respectively. The distance between adjacent magnetic recording bits is about 16 µm. It can be seen from the figures that the dual-pulse super-resolution magnetic recording method will not affect the surrounding recording bits, and can effectively reduce the distance between the recording bits and increase the recording density. If we further fine-tune the overlapped area of the two pump pulses and $F_2/F_1$, we will expect to obtain magnetic recording bits with smaller lateral dimensions and higher magnetic recording density.

In the above embodiments, specific samples are selected as specific implementations, and the inventor has studied that other ferrimagnetic magneto-optical materials, especially GdFeCo material with different composition ratios, can be designed according to the principles of the present invention.

In addition, the focal spot of the first excitation pulse is a circular or elliptical focal spot, and the focal spot of the second modulation pulse is a circular, elliptical, or annular focal spot.

In other embodiments, the second modulation pulse can be formed by beam shaping of multiple pulses at the same time, and thereby, focal spot with arbitrary shapes can be obtained.

The above-mentioned embodiments are part of the embodiments of the present invention, but the embodiments of the present invention are not limited by the above-mentioned embodiments. For example, in the present invention, the following changes can be made: changes in the wavelength and the polarization state of the pump pulses and the detection pulse, changes in the spatial mode or topographic distribution of the focal spots of the pump pulses on the sample surface, and changes of the specific element composition or film structure of the magneto-optical material that can realize single-pulse opto-magnetic reversal. Any other changes, modifications, substitutions, combinations, and simplifications that do not depart from the spirit and principle of the present invention should be equivalent replacement methods and are all included in the protection scope of the present invention.

What is claimed is:

1. A dual-pulse excitation method for ultra-fast, super-resolution all-optical magnetic recording, comprising the steps of:
   providing a first excitation pulse and a second modulation pulse, the first excitation pulse and the second modulation pulse being both femtosecond laser pulses, and the energy density of the second modulation pulse is less than that of the first excitation pulse; and
   focusing the first excitation pulse and the second modulation pulse, and then radiating the two pulses in sequence to a magneto-optical recording medium, so that an area of the magneto-optical recording medium irradiated by a laser pulse spot undergoes all-optical magnetization reversal;
   the magneto-optical recording medium being a magneto-optical material capable of realizing opto-magnetic reversal by a single laser pulse, the minimum energy density threshold required for realizing all-optical magnetization reversal by a single laser pulse being F, and the energy density of the second modulation pulse<Threshold F≤the energy density of the first excitation pulse;
   the critical time interval between two magnetic reversals of the magneto-optical material being $\Delta t_c$, and $\Delta t_c$≤the successive incidence time interval between the first excitation pulse and the second modulation pulse<1 nanosecond;
   the focal spot of the first excitation pulse and the focal spot of the second modulation pulse having an overlapping portion and a non-overlapping portion, and when the second modulation pulse being radiated to the overlapped portion afterwards, the undissipated part of the energy generated by the radiated first excitation pulse at the beginning being remained in the overlapping portion; the overlapping portion of the focal spot of the first excitation pulse returning to the initial magnetic state after two magnetization reversals, and the non-overlapping portion of the focal spot of the first excitation pulse retaining one magnetization reversal to form a magnetic recording bit.

2. The method as recited in claim 1, wherein the magneto-optical material is a ferrimagnetic material.

3. The method as recited in claim 2, wherein the ferrimagnetic material is GdFeCo or TbFeCo.

4. The method as recited in claim 1, wherein the magneto-optical material is a ferromagnetic material.

5. The method as recited in claim 1, wherein the second modulation pulse is a single-pulse, or is formed by beam shaping of multiple pulses at the same time.

6. The method as recited in claim 1, wherein the focal spot of the first excitation pulse is a circular or elliptical focal spot, and the focal spot of the second modulation pulse is a circular, elliptical, or annular focal spot.

7. The method as recited in claim 1, wherein if the focal spot of the second modulation pulse has a portion that does not overlap with the first excitation pulse, since its energy density is lower than the threshold value F, optical magnetization reversal cannot occur.

8. The method as recited in claim 1, wherein the energy density of the first excitation pulse has a maximum value, above which the magneto-optical material will generate a multi-domain magnetization state.

9. The method as recited in claim 1, wherein when the second modulation pulse is radiated to the overlapping portion of the first excitation pulse focal spot, the added density of the energy density of the second modulation pulse and the undissipated energy of the overlapping portion is greater than the threshold F.

10. The method as recited in claim 1, wherein the ratio of the area between the overlapping portion and the non-overlapping portion of the first excitation pulse and the second modulation pulse is adjustable; and the energy densities of the first excitation pulse and the second modulation pulse are adjustable.

11. The method as recited in claim 1, wherein the time interval between the first excitation pulse and the second modulation pulse is precisely controlled by an optical delay line.

\* \* \* \* \*